Figure 1:
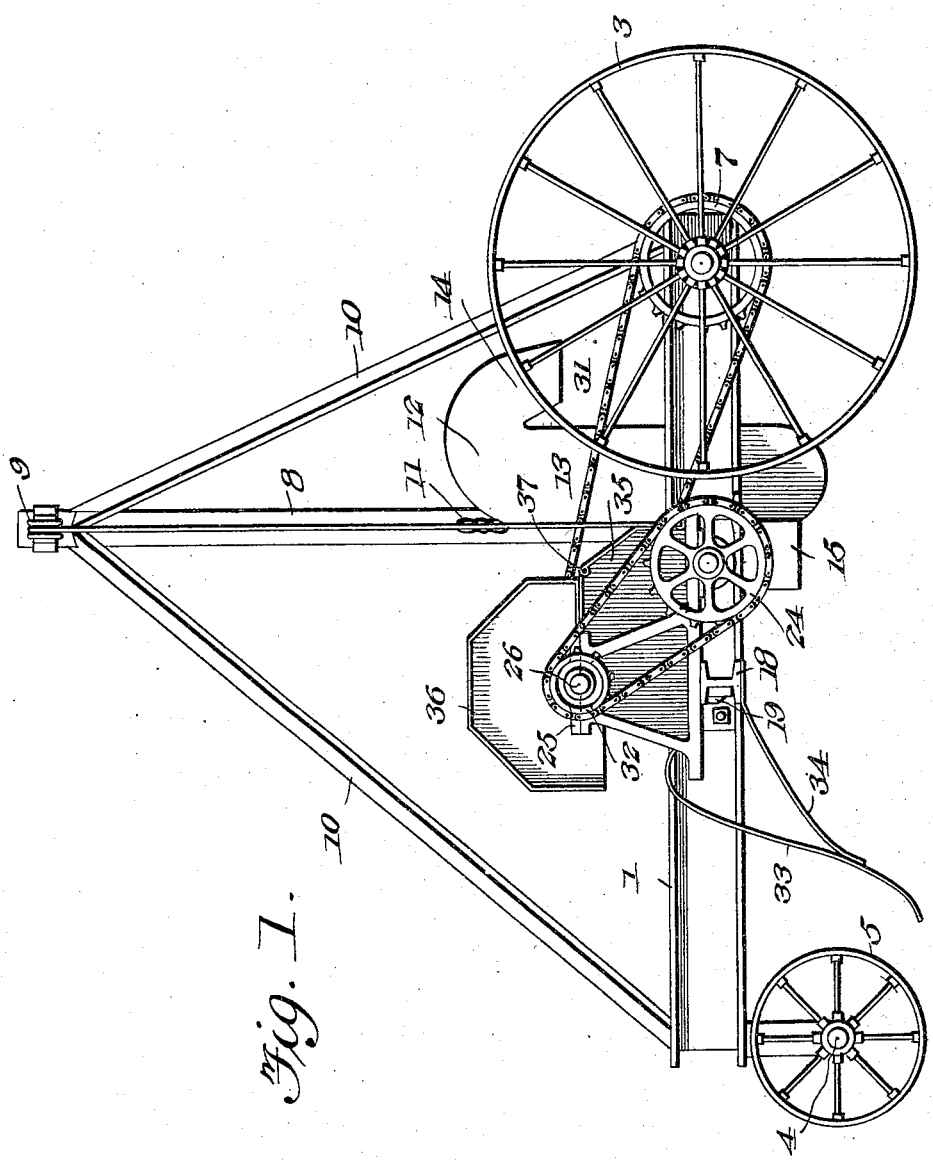

N. LOUVIERE.
RICE HARVESTING MACHINE.
APPLICATION FILED APR. 26, 1915.

1,188,290.

Patented June 20, 1916.
3 SHEETS—SHEET 1.

Witnesses
Hugh H. Ott
J. W. Garner

Inventor
Nicholas Louviere
By Victor J. Evans
Attorney

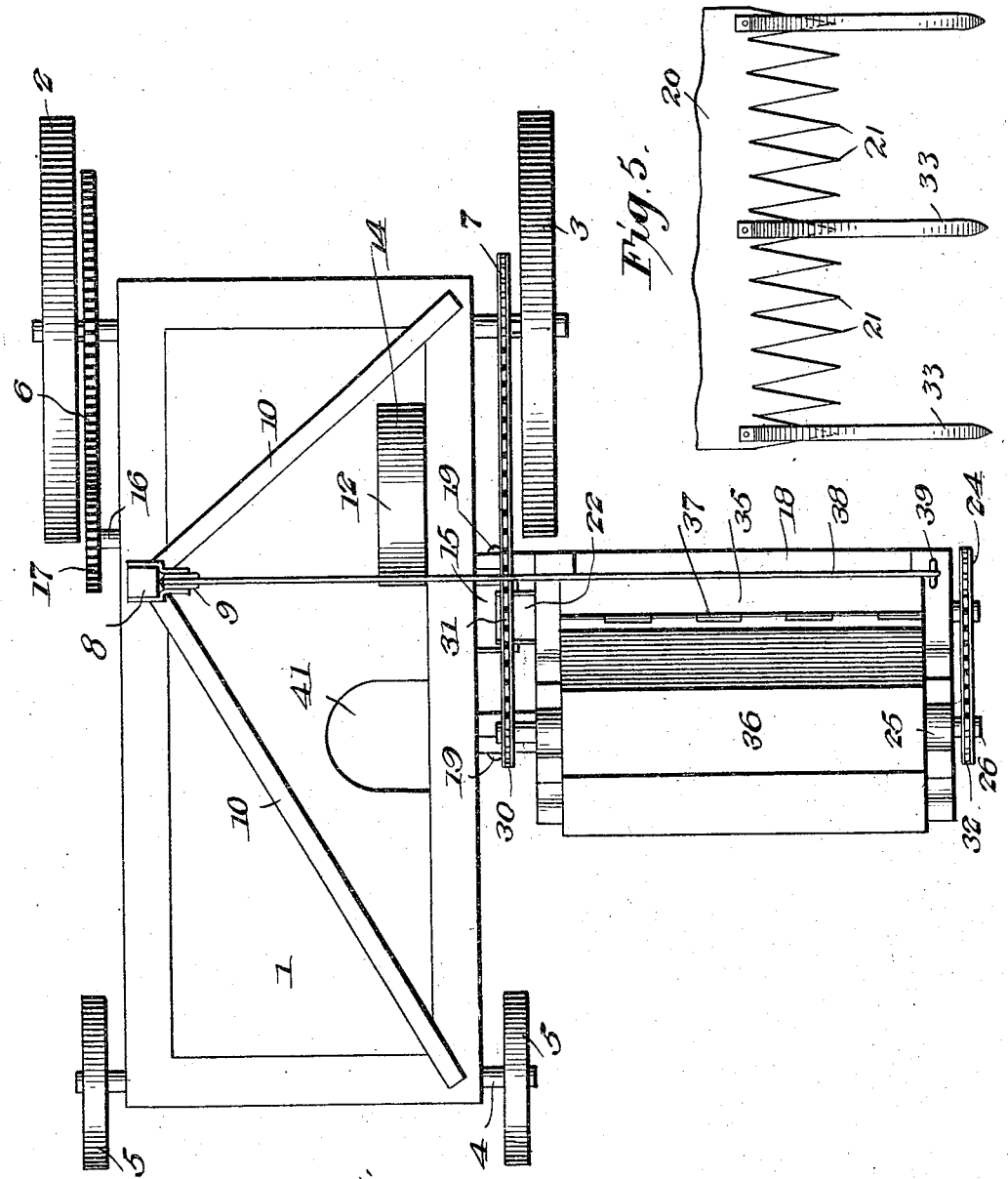

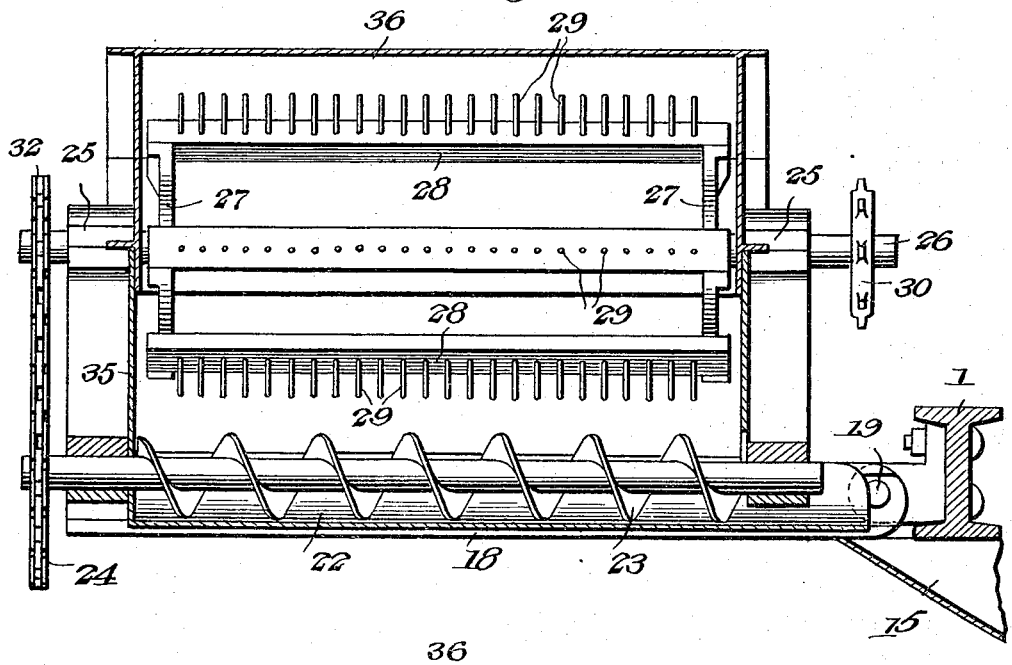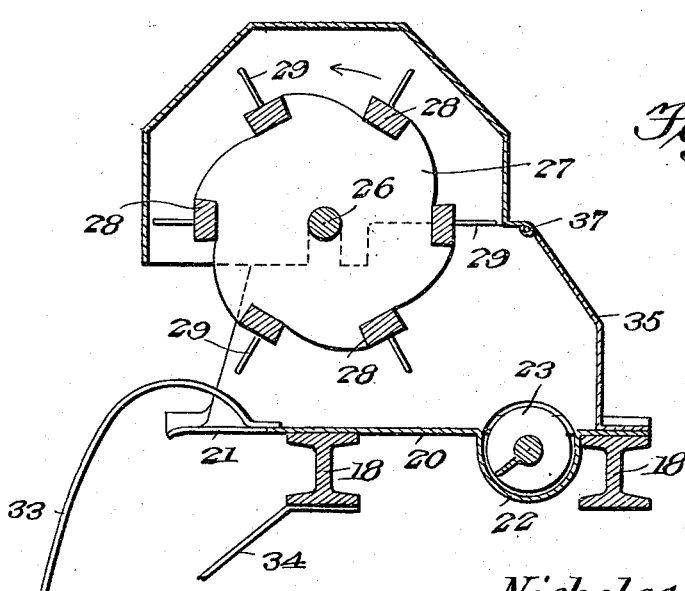

UNITED STATES PATENT OFFICE.

NICHOLAS LOUVIERE, OF UNION POST OFFICE, LOUISIANA.

RICE-HARVESTING MACHINE.

1,188,290.  Specification of Letters Patent.  Patented June 20, 1916.

Application filed April 26, 1915. Serial No. 23,950.

*To all whom it may concern:*

Be it known that I, NICHOLAS LOUVIERE, a citizen of the United States, residing at Union Post Office, in the parish of St. James and State of Louisiana, have invented new and useful Improvements in Rice-Harvesting Machines, of which the following is a specification.

This invention is an improved rice harvesting machine for threshing the rice from standing stalks, the object of the invention being to provide an improved machine of this character which is cheap and simple, which avoids cutting and handling the straw in harvesting rice and which requires a comparatively slight expenditure of power in its operation.

The invention consists in the construction, combination and arrangement of devices hereinafter described and claimed.

In the accompanying drawings: Figure 1 is a side elevation of a rice cutting machine constructed in accordance with my invention. Fig. 2 is a plan of the same. Fig. 3 is a transverse sectional view of the same. Fig. 4 is a detail longitudinal sectional view of the harvesting mechanism. Fig. 5 is a detail plan of the comb plate and lifting arms.

In accordance with my invention I provide a frame or truck 1 which is provided with rear wheels 2—3 and is also provided with a front axle 4 on which are wheels 5. The truck may be drawn by a team or propelled by a suitable motor as desired. On the inner side of the wheel 2 is a spur wheel 6 which revolves therewith. The wheel 3 has a sprocket wheel 7 on its inner side. A post 8 rises vertically from the outer side of the truck at a suitable distance from the rear end thereof and is provided at its upper, on its inner side, with a pulley 9. Inclined braces 10 are also provided for the post. On the inner side of the post, near its lower end is a cleat 11. An endless elevator 12 is at the inner side of the truck, near the rear end, and its trunk 13 is provided at its upper end on its rear side, with a discharge spout 14. At the lower end of the trunk, and arranged under the inner side of the truck is a hopper 15 which discharges into the lower end of the trunk. The driving shaft 15 of the elevators is provided at its outer end with a spur gear 17 which is engaged by the gear 6 of the wheel 2 so that said elevator is driven by power from said wheel 2.

The rice threshing mechanism is mounted on a frame 18 which is arranged at the inner side of the truck and is pivotally connected thereto as at 19 so that the threshing mechanism may be extended horizontally from the inner side of the truck or may be turned upwardly to a vertical position, and arranged over the truck so as to be out of the way when the machine is moved from place to place. At the front side of said frame 18 is a plate 20 which is provided at its front side with comb teeth 21. At the rear of the comb plate is a horizontally arranged feed trunk 22, which is semi-tubular and open at its upper side and in which operates a feed screw 23. At the outer end of the feed screw shaft is a sprocket wheel 24. Bearings 25 are secured at the front corners of the frame 18 and a thresher shaft 26 is mounted in said bearings. This thresher shaft is provided with heads 27 which are connected together by bars 28 that are suitably spaced apart and the said bars are provided with outwardly extending thresher teeth 29. The thresher cylinder thus constructed is adapted to revolve over the comb plate so that as the machine is drawn forwardly the rice stalks are caught between the comb teeth and the thresher teeth move rearwardly through the heads of the rice and strip and thresh the same from the rice stalks and sweep the grains rearwardly into the conveyer trunk, the screw in the conveyer trunk delivering the grain to the hopper which feeds the same to the elevator. An attendant, on the truck causes the grain discharged by the elevator to be caught in sacks.

The thresher shaft is provided near its inner end with a sprocket wheel 30 which is connected by an endless sprocket chain 31 to the sprocket wheel 7 on the drive wheel 3, and hence the thresher cylinder is driven through directly from said drive wheel 3. At the outer end of the thresher shaft is a sprocket wheel 32 which is connected by an endless sprocket chain in the wheel 24 of said screw.

In order to raise fallen stalks of rice and cause the grain therefrom to be harvested by the machine I also provide a series of forwardly and downwardly extending lifting arms 33. The upper ends of these arms are secured on the comb plate at certain suitable points. These lifting arms are braced and held in place by means of braces 34 the rear ends of which are attached to the front cross bar of the frame 18. A suitable casing 35 is provided for the threshing mechanism and includes a hinged cover 36, which is hinged or pivotally mounted at its rear side as at 37 so that it can be swung rearwardly to uncover the threshing mechanism when desired. To raise and lower the threshing mechanism I provide a suitable cord or rope 38 which is attached to the frame 18 as at 39 and passes over the pulley at the upper end of the post. When the thresher mechanism is raised the inner end of the shaft of the threshing cylinder, together with the sprocket wheel thereon passes through an opening 41 in the platform of the truck. The cleat enables the rope to be secured with the thresher in upright position.

Having thus described my invention, I claim:

1. In a rice harvesting machine, a truck, an elevator mounted on the truck, a threshing mechanism at one side of the truck and including a plate, comb teeth at the front side of the plate and a feed trunk in the rear portion of the plate and having a spout at its inner end arranged to discharge directly into the elevator, a revoluble threshing cylinder mounted above the plate, means to operate said cylinder, a conveyer screw arranged in the feed trunk, and means to operate the said screw.

2. In a rice harvesting machine, a horizontally arranged plate, comb teeth at the front side of the plate, a revoluble threshing cylinder mounted above the plate and lifting arms extending downwardly and forwardly from the plate and having their upper ends curved rearwardly and downwardly and attached to the plate at the rear ends of the comb teeth, the upper, curved portions of the said teeth being above said plate.

3. In a rice harvesting machine, a frame, a horizontally arranged plate secured on the frame, comb teeth at the front side of the plate, a revoluble threshing cylinder mounted above the plate and lifting arms extending downwardly and forwardly from the plate and having their upper ends curved rearwardly and downwardly and attached to the plate at the rear ends of the comb teeth, the upper curved portions of the said teeth being above said plate and braces under the comb plate, in line with the lifting arms, having their rear ends attached to the frame, said braces extending forwardly and downwardly and having their front ends attached to the lifting arms.

4. In a rice harvesting machine, a truck, an elevator mounted on the truck, a frame carried by the truck and projecting from one side thereof, a substantially horizontal plate on said frame and provided at its front side with comb teeth, a conveyer, at the rear side of said plate, also carried by said frame and arranged to discharge into the elevator, a revoluble threshing cylinder mounted above the plate, means to operate the threshing cylinder, and means to operate said conveyer.

5. In a rice harvesting machine, a truck, an elevator mounted on the truck, a frame carried by the truck and projecting from one side thereof, a substantially horizontal plate on said frame and provided at its front side with comb teeth, a conveyer, at the rear side of said plate, also carried by said frame and arranged to discharge into the elevator, a revoluble threshing cylinder mounted above the plate, means to operate the threshing cylinder, means to operate said conveyer, and lifting arms extending downwardly and forwardly from the plate and having their upper ends curved rearwardly and downwardly and attached to the plate at the rear ends of the comb teeth, the upper curved portions of said lifting arms being arranged above the plate.

6. In a rice harvesting machine, a truck, an elevator mounted on the truck, a frame carried by the truck and projecting from one side thereof, a substantially horizontal plate on said frame and provided at its front side with comb teeth, a conveyer, at the rear side of said plate, also carried by said frame and arranged to discharge into the elevator, a revoluble threshing cylinder mounted above the plate, means to operate the threshing cylinder, means to operate said conveyer, the said frame being pivotally connected to said truck for vertical angular movement and said truck being provided with means for raising and lowering said frame.

In testimony whereof I affix my signature in presence of two witnesses.

NICHOLAS LOUVIERE.

Witnesses:
  FELECIEN CHAUVIN,
  PAUL LeBOUEF.